United States Patent [19]

Nauta et al.

[11] 4,211,743

[45] Jul. 8, 1980

[54] APPARATUS AND METHOD FOR EMBOSSING WEB MATERIAL

[75] Inventors: Jan P. Nauta, New Britain; Jacob J. Kos, Plainville, both of Conn.

[73] Assignee: Nauta Roll Corporation, Kensington, Conn.

[21] Appl. No.: 909,013

[22] Filed: May 24, 1978

[51] Int. Cl.$^2$ .............................................. B29C 17/00
[52] U.S. Cl. ..................................... 264/284; 29/132; 425/363; 425/373; 425/385
[58] Field of Search ............... 425/373, 385, 335, 363, 425/403; 264/284, 293; 29/132

[56] References Cited

U.S. PATENT DOCUMENTS

| | | | |
|---|---|---|---|
| 2,928,124 | 3/1960 | Hugger | 425/385 |
| 2,947,058 | 8/1960 | Landells et al. | 425/373 |
| 3,060,515 | 10/1962 | Corbett | 425/385 |
| 3,539,671 | 11/1970 | Nauta | 264/284 |
| 3,605,194 | 9/1971 | Nauta . | |
| 3,636,147 | 1/1972 | Rowland . | |
| 3,751,550 | 8/1973 | Nauta . | |
| 3,839,514 | 10/1974 | Nauta . | |
| 3,911,187 | 10/1975 | Raley | 264/284 |
| 3,950,480 | 4/1976 | Adams et al. . | |

*Primary Examiner*—James B. Lowe

[57] ABSTRACT

Apparatus for embossing web material such as a heated thermoplastic web material comprises first and second embossing members each having a resilient embossing surface, and means mounting the embossing members for relative movement to define a roll nip between them. The resilient surface of the first embossing member has a primary embossing pattern thereon and is of harder durometer than the resilient surface of the second embossing member. Both resilient surfaces are soft enough to be temporarily deformed in the roll nip to press the web material between them into surface conforming contact with the primary embossing pattern. The temporary deformation also helps to expel air from between the web material and the primary embossing pattern to insure surface conforming contact of the web to the embossing pattern. A secondary embossing pattern is provided on the resilient surface of the second embossing member and is of lesser depth than the primary embossing pattern. The temporary deformation assists in providing full contact with both patterns.

A method of embossing the material includes heating the thermoplastic web material to a temperature within its softening range, introducing the heated material to a nip formed between the first and second embossing members, and allowing the embossed material to cool to set the pattern before removing it from the first embossing member.

16 Claims, 10 Drawing Figures

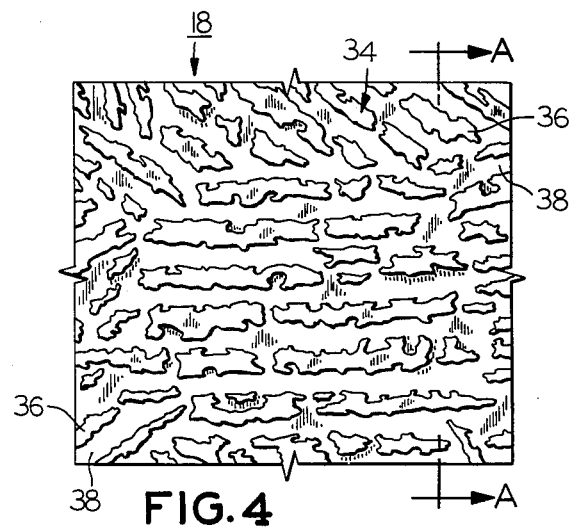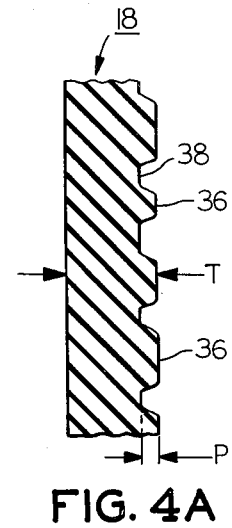
FIG.4  FIG.4A
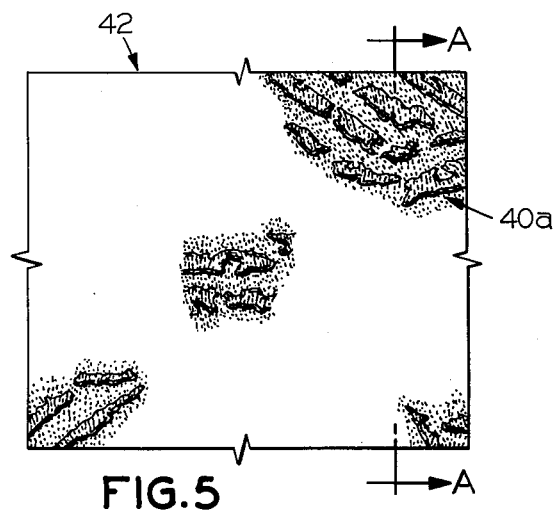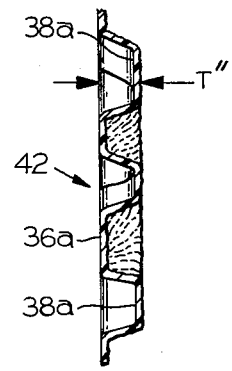
FIG.5  FIG.5A
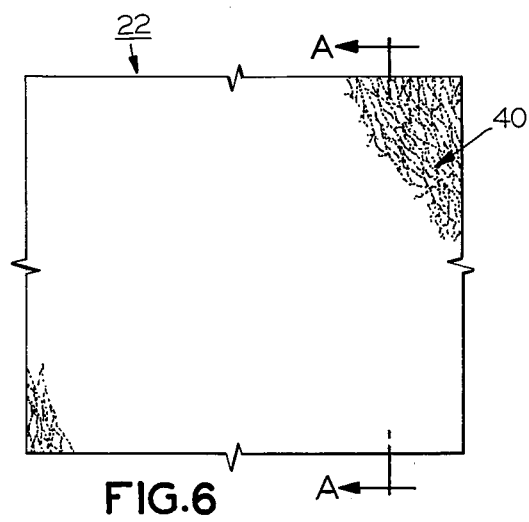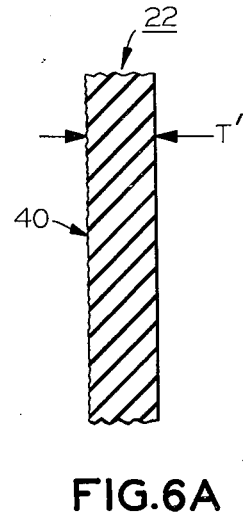
FIG.6  FIG.6A

APPARATUS AND METHOD FOR EMBOSSING WEB MATERIAL

BACKGROUND OF THE INVENTION

The present invention concerns an apparatus for embossing thermoplastic web material and a method of employing the apparatus to provide an embossed material, preferably a material embossed with two overlying patterns.

Use of a pair of embossing rolls arranged to move relative to each other to form a roll nip therebetween is of course old and well known in the art. Similarly, the use of an embossing roll having a resilient outer surface providing an embossing pattern is also known and, although the prior art generally employs a combination of one resiliently faced roll and one rigid roll such as a conventional steel roll, the use of a pair of resiliently faced rolls is known. For example, see U.S. Pat. No. 3,605,194 issued Sept. 20, 1971, Jan P. Nauta. See also, U.S. Pat. Nos. 3,636,147; 3,751,550; 3,839,514; and 3,950,480 dealing with embossing roll apparatus.

Certain difficulties are encountered with prior art apparatus and methods when it is attempted to emboss relatively thin web material of up to about 0.050 inches (fifty mils) thick, with patterns of which are of the depth as great or greater than the thickness of the web material.

One such difficulty occurs when it is attempted to emboss a relatively deep pattern into such a relatively thin thermoplastic sheet by conforming the heated material to the embossing pattern. For example, the thermoplastic sheet of material 3 mils thickness may be embossed with a pattern up to fifty mils in depth by stretching and pressing the sheet material into conformity with an embossing pattern having pattern recesses of about 50 mils in depth and cooling to set the pattern. There is a tendency for the plastic sheet material not to conform fully to each bond and recess provided by the embossing pattern. The difficulty is aggravated by the entrapment of air between the material and the roll pattern, the entrapped air pockets tending to hold the sheet material out of such surface conforming contact. Vacuum forming of individual lengths of sheet material overcomes this problem but is not adaptable to a continuous web embossing process.

Yet another difficulty is encountered when it is attempted to simultaneously emboss two overlying patterns on the sheet, one of which is a deep pattern relative to the thickness of the film. Heretofore, it has been difficult to superimpose the second pattern fully onto the deep pattern because of the inability of the roll providing the second embossing pattern to emboss in the deeper recesses of the deep pattern.

It is accordingly an object of the present invention to provide a novel method and apparatus for embossing web material which overcomes the foregoing and other difficulties.

It is another object to provide such a novel embossing apparatus utilizing first and second embossing members, each employing a resilient embossing surface of a selected range of hardness, with one embossing surface being harder by a specified amount than the other and having a primary embossing pattern thereon.

Other objects and advantages of the present invention will become apparent from the following description thereof.

SUMMARY OF THE INVENTION

In accordance with the present invention, there is provided an improvement in conventional apparatus for embossing a thermoplastic web material of the type including, a first embossing pattern, a second embossing member having a resilient embossing surface, means mounting the first and second embossing members for relative rotation to define a roll nip therebetween, and means to pass a heated thermoplastic sheet material through the nip to form an embossed pattern thereon. In this improvement, the resilient surface of the first embossing member has a hardness of about 50 to 85 durometer on the Shore A scale and is at least about 5 durometer (Shore A scale), preferably 5 to 15 durometer, harder than the resilient surface of the second embossing member. Accordingly, the resilient surface of the second member has a hardness of about 45 to 80 durometer (Shore A scale). The tangential pressure at the roll nip is sufficient to temporarily deform both resilient surfaces. The associated web material is pressed in the nip between the resilient surfaces into surface-conforming contact with the primary embossing pattern.

The resilient surface of the second embossing member provides a secondary embossing pattern. Further, the primary embossing pattern may be provided by lands and recesses, and the recesses are deeper than any recesses provided by the secondary embossing pattern.

The resilient embossing surfaces are preferably made of silicone rubber and are at least about 1/16 of an inch thick. The embossing members may be provided by sleeves mounted over rollers such as steel rollers. Alternatively, the first embossing member may be provided by an endless belt mounted over belt support rollers.

The method may employ a hot web of the thermoplastic material issuing from an extruder or calendar, or it may employ a preformed sheet material which is heated to an elevated temperature within its softening range. Preferably, this temperature is below its crystalling melting point if the sheet material is being moved horizontally so that it retains self-supporting characteristics. The heated web material is passed into the roll nip defined by the two embossing members with their respective resilient embossing surfaces. Sufficient pressure is exerted at the nip to temporarily deform both resilient surfaces to press the web material between the resilient surfaces into surface conforming contact with the rolls and their embossing pattern(s).

After the web material exits from the nip, it continues in contact with the first embossing member and is cooled to set the embossed pattern therein, after which it is stripped from the first embossing member at a point spaced from the roll nip.

As previously indicated, the resilient embossing surface of the second embossing member provides a secondary embossing pattern, and the web material is pressed at the roll nip into surface conforming contact with the secondary embossing pattern as well.

BRIEF DESCRIPTION OF THE DRAWINGS

FIG. 4 is a plan view of a portion of the resilient embossing surface of the first embossing member;

FIG. 4A is a cross sectional view taken along line A—A of FIG. 4 and on an enlarged scale relative thereto;

FIG. 5 is a partial plan view of an embossed thermoplastic sheet material produced by the apparatus and method of the present invention;

FIG. 5A is a cross sectional view taken along line A—A of FIG. 5 and on an enlarged scale relative thereto;

FIG. 6 is a partial plan view of the resilient embossing surface of a second embossing member; and FIG. 6A is a cross sectional view taken along line A—A of FIG. 6 and on an enlarged scale relative thereto.

DESCRIPTION OF THE PREFERRED EMBODIMENTS

Figure 1:
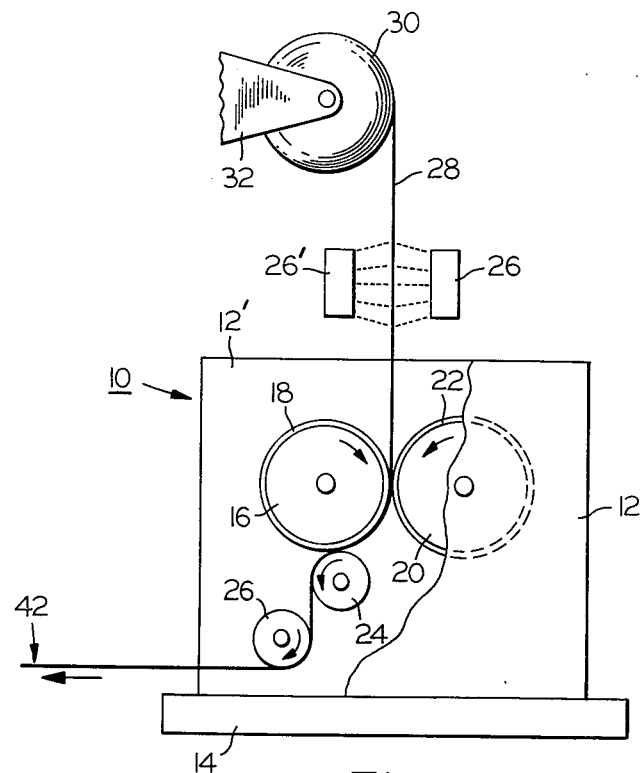
FIG. 1 is a schematic side elevational view of apparatus embodying the invention with parts broken away for clarity of illustration.

Referring now to FIG. 1, there is generally indicated at 10 in schematic representation an embossing apparatus comprising one embodiment of the present invention. Extending upwardly from the base member 14 is a pair of upright support plates 12, 12' are disposed parallel to and spaced apart from each other. The support plates 12, 12' each have formed therein suitable openings supporting bearings or the like (not shown) in which are mounted, respectively, a first roller 16 and a second roller 20 for rotation about respective parallel axes of rotation. First roller 16 and second roller 20 are each substantially cylindrical in shape and have protruding end stub shafts 16a, 20a extending axially therefrom on either side thereof and adapted to be received within the bearings (not shown) to permit rotation of the rollers 16,20. A suitable drive train (not shown) to rotate rollers 16, 20 is provided; since such a mechanism is well known and conventional in the art, it is not shown or further described herein.

First roller 16 which, like roller 20, may be made of steel, has a resilient embossing surface provided by a resilient rubber sleeve 18. Second roller 20 also has a resilient embossing surface provided by a second resilient rubber sleeve 22. Rubber sleeve 18, and in a preferred embodiment rubber sleeve 20, are provided with embossing patterns. First roller 16 and its rubber embossing sleeve 18 together comprise a first embossing member. Similarly, second roller 20 and its embossing rubber sleeve 22 together comprise a second embossing member. Rollers 16 and 20 may be heated internally by circulating therein oil or water or steam, as is known in the art.

A take-off roller 24 is mounted for rotation between upright support plates 12, 12' in a manner similar to that in which rollers 18 and 20 are mounted. A guide roller 26 is similarly mounted between support plates 12, 12'. All the rollers generally equal, and preferably at least slightly exceed, in length the width of the web material to be passed thereover.

A pair of heaters 26, 26' are supported by means not shown and are disposed on opposite sides of a web 28 of thermoplaetic material which is unwound from a material roll 30 on the roll support 32. Web 28 is heated as it passes between heaters 26, 26' (which may be gas or electric, or any other type of heater suited to the purpose) and is then passed into the roll nip formed between the first and second embossing members provided by, respectively, first roller 16, second roller 20 and their associated rubber sleeves 18, 22. The drive means (not shown) and the various rollers driven thereby provide the means to draw the thermoplastic web material through the nip formed between the embossing members.

Figure 3:
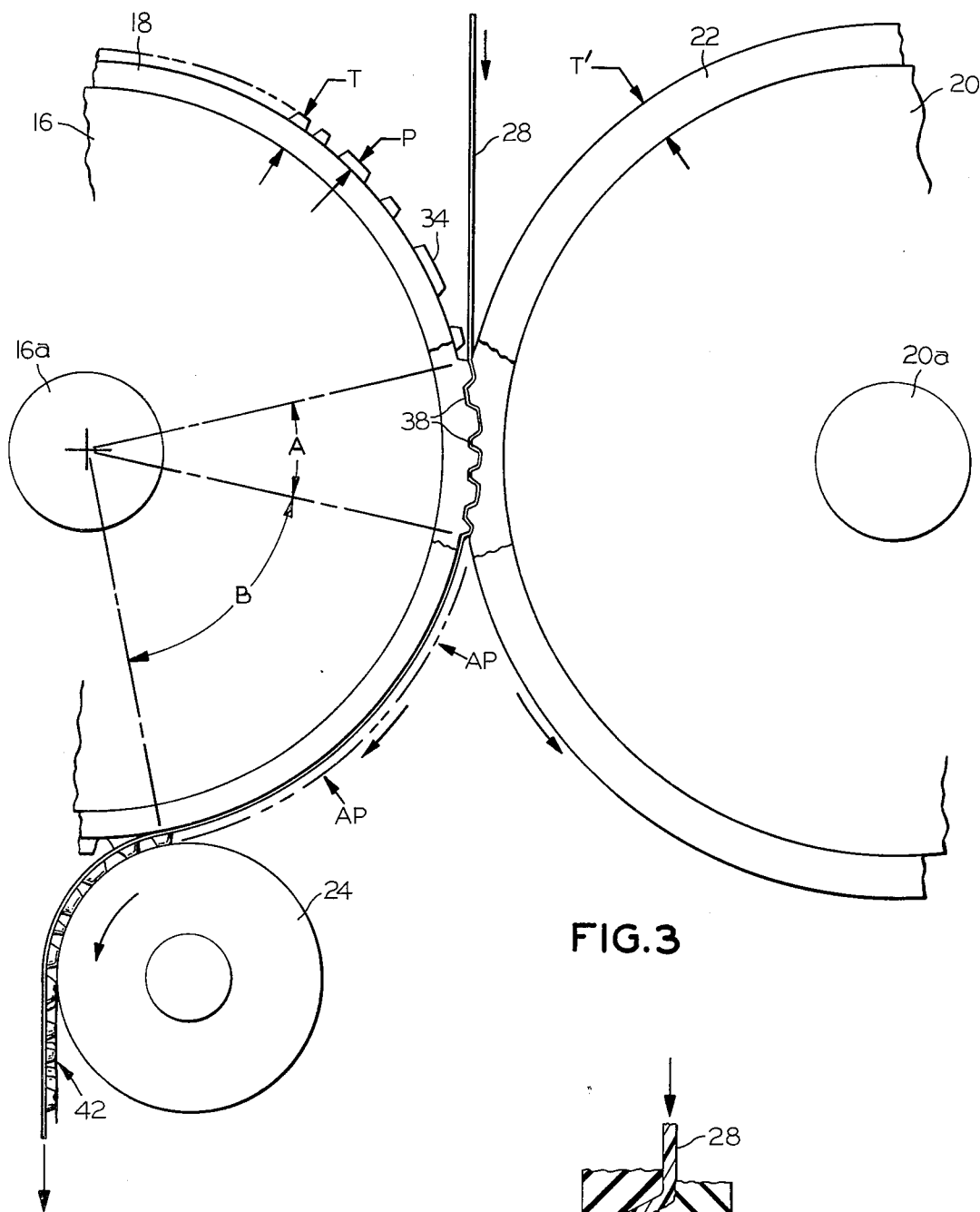
FIG. 3 is a partial side elevational view of the apparatus of FIG. 1 drawn on a scale enlarged relative to that of FIG. 1.

Referring now to FIG. 3, a portion of the apparatus of FIG. 1 is shown in enlarged scale. FIG. 3, like the other figures, is not drawn completely to scale but certain dimensions are exaggerated for clarity of illustration. Rubber sleeve 18 has a primary embossing pattern 34 formed therein. As best shown by considering FIGS. 3, 3A, 4 and 4A, primary embossing pattern 34 is formed by a series of irregularly shaped lands 36 defined and separated by corresponding irregularly shaped recesses 38. Obviously, the shapes of the lands and recesses may be any desired shape, regular or irregular. The embossing pattern is formed in rubber sleeve 18 by means well known in the art and is not critical to the present invention and will therefore not be further described.

Rubber sleeve 18 is made of a relatively high temperature resistant, resilient material such as, a silicone rubber or polyurethane and is thick enough to provide sufficient resiliency for the purposes to be described hereinafter. Typically the thickness of the rubber sleeve 18, indicated by dimension arrow T in FIGS. 3 and 4A, is between about 0.31 to 0.48 centimeters ($\frac{1}{8}$ to 3/16 of an inch). Obviously, the thickness may be somewhat greater or even somewhat lesser in a given case. Generally, a minimum thickness of at least about 0.16 centimeters (1/16 of an inch) will accommodate most practical situations. Although the thickness may exceed 1.27 centimeters, no particular advantage is gained thereby. Moreover, the sleeve may be a composite of two or more layers of the elastomer, the underlying layers being harder. In fact, the sleeve may be molded directly onto a steel shaft if so desired. Generally, the depth of the recesses 38 as indicated by the dimension arrow P in FIGS. 3 and 4A is between about 3 and 50 mils, i.e., between about 0.003 and 0.050 inches.

Generally, the resilient embossing surface having the primary embossing pattern 34 thereon should have a hardness of about 50 to 85 durometer on the Shore A scale and should be at least about 5 durometer harder, on the same scale, than the resilient embossing surface of the second embossing member. (All references to durometer herein refer to the Shore A scale.)

Turning now to FIGS. 3, 6 and 6A, rubber sleeve 22 is also resilient and has a hardness in the range of about 45 to 80 durometer and is at least 5, and preferably about 5 to 15 durometer softer, than resilient sleeve 18.

The overall thickness T' of rubber sleeve 22 is preferably in the same range as that of rubber sleeve 18, i.e., between about 0.32 to 0.48 centimeters. However, it may be thinner in some cases, or thicker, so long as the effect upon relative compressibility is recognized.

A secondary embossing pattern 40 is similarly formed of irregularly shaped lands and recesses but preferably, in a much finer and much more shallow pattern. In fact, secondary embossing pattern 40 is conveniently a grain effect, i.e., a stippled pattern. For example, it may be a pig-skin textured pattern whose recesses may be as little as a fraction of a mil in depth as compared to the 3 to 50 mils depth of the primary embossing pattern. By a grain effect pattern, it is meant a textured surface pattern as contrasted to a pattern provided by clearly defined lands and recesses.

Figure 3A:
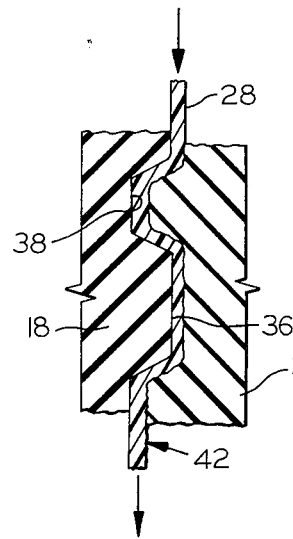
FIG. 3A is a schematic side elevational view of a portion of the apparatus illustrated in FIG. 3 drawn on a scale which is enlarged relative to the scale of FIG. 3.

Referring now to FIGS. 3 and 3A, the web 28 of heated thermoplastic material, which has been heated to at least within its softening range, is passed into the roll nip indicated by the segment A in FIG. 3, in which sufficient pressure is exerted to temporarily deform both the resilient embossing surfaces provided by sleeves 18, 22, into a "flat." Because sleeve 22 is softer by at least 5 durometer than sleeve 18, it is deformed to a somewhat greater extent. As shown in FIG. 3A, sleeve 22 is deformed sufficiently to force the heated thermoplastic film 28 into full surface conforming contact within the recesses 38 of primary embossing pattern 34 and secondary embossing pattern 40. The resiliency of sleeve 18 causes it to be deformed sufficiently to help open the recesses 38 of pattern 34 to facilitate the escape of air from between sleeve 18 and material 28. Deformation of sleeve 22 also facilitates the escape of air from between material 28 and sleeve 22. The ability of sleeve 22 to "follow" film 28 within the recesses 38 of primary embossing pattern 34, and the facilitation of the escape of air, enables the pressing of the film 28 into full surface conforming contact with the recesses and lands of pattern 34. However, while the gross or deep pattern provided by primary embossing patter 34 is initially formed in film 28, the finer grain-like pattern provided by secondary embossing pattern 40 is also formed, from the opposite side, into film 28. The result is a full embossing of both patterns with the result that the stipple or grain-like pattern 40 completely overlies both the lands and recesses formed in the web material 28 by primary pattern 34.

FIG. 3A, which is not necessarily drawn to scale, illustrates the conformity of film 28 within pattern 34, the deformation of sleeve 22 being sufficient to enable it to follow the material generally fully within recesses 38 in the nip.

As the film 28 emerges from the nip in direction of the arrows shown in FIG. 3, expulsion of air from between film 28 and sleeve 18 and the greater hardness of sleeve 18 compared to sleeve 22 causes material 28 to follow the first embossing member provided by roller 16 and sleeve 18. Moreover, it is believed that the softer sleeve 22 is so deformed by the compression at the nip that it bulges on the trailing or inlet side and has the apparent effect of a greater circumferential speed. These several effects, together with the preferably higher temperature of the sleeve 18, cause the film 28 to conform closely to the embossing pattern 34 as the film 28 and sleeve 18 exit the nip. Air pressure indicated by the arrows AP assist in holding the deformed film into surface conforming contact with the lands and recesses of pattern 34 due to the expulsion of air from beneath the material providing, in effect, a vacuum forming type of operation in segment B of the roller; this is its travel from the nip to take-off roll 24. The embossed material 28 cools here somewhat and the embossed pattern is set therein. The embossed material is removed from roller 16 at take-off 24 for passage to a take-up reel or other processing equipment (not shown).

Referring now to FIGS. 5 and 5A, the finished embossed material is seen to provide a plurality of irregularly-shaped lands 36a and recesses 38a corresponding generally to lands and recesses 36 and 38 of sleeve 18. These lands and recesses 36a, 38a are overlaid by a stipple or grain effect pattern 40a corresponding to secondary embossing pattern 40, so as to provide a pleasing full double pattern effect.

As best seen in FIG. 5A, the overall thickness T" of the embossed material 42 generally corresponds to the depth of recesses 38 plus the final thickness of the web material 28. Material 28 may be thermoplastic film of a thickness, for example, between 1 and 20 mils, conveniently 3-8 mils, and the embossed material may have overall thickness T" of 20 to 55 mils or more. The embossed material thus has, for the overall thickness defined by its outermost surfaces, a relatively very large void space. This provides highly satisfactory large bulk for relatively little material. Sound and heating insulating properties are thus quite good considering the small quantity of material contained per unit area of the embossed product.

Figure 2:
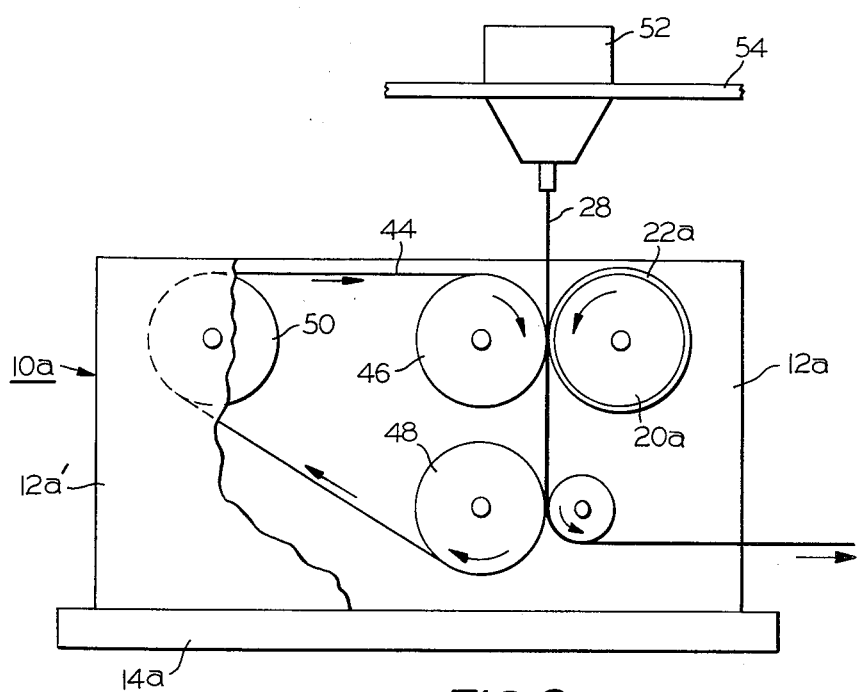
FIG. 2 is a schematic side elevational view with parts broken away of a second embodiment of apparatus.

Referring now to FIG. 2, there is schematically illustrated another embodiment of the apparatus of the invention. Some of the parts which correspond to and are substantially identical to the parts of the FIG. 1 embodiment are identically numbered except for the added letter "a." Thus, the second illustrated embodiment of the embossing apparatus is generally indicated at 10a and includes a pair of spaced apart generally parallel upright support plates 12a and 12a' supported on a base member 14a. A second roller 20a having a rubber sleeve 22a theron is mounted for rotation between support plates 12a and 12a'. In this case, however, an endless embossing belt 44 is mounted to be driven over belt rollers 46,48,50 which are mounted for rotation between support plates 12a and 12a'. Belt rollers 46, 48 and 50 are adapted to have embossing belt 44 trained thereover to form a pressure exerting roll nip between a first embossing member comprised of belt 44 and belt rollers 46, 48 and 50 on the one hand, and a second embossing member comprised of second roller 20a and rubber sleeve 22a on the other hand.

In this case, the thermoplastic web material 28 is provided from an extrusion die 52 supported on a die support 54. The extruder is not shown. The freshly extruded film is at its elevated forming temperature and heaters such as 26,26' of the FIG. 1 embodiment are therefore not required. As with the FIG. 1 embodiment, the respective durometers of embossing belt 44 and rubber sleeve 42a are within the specified range, so that both are deformed within the nip provided between the first and second embossing members, more specifically, between mounting roller 46 and roller 20a. The hardness of belt 44 is harder than that of rubber sleeve 22a by at least five (5) durometer Shore A scale. A take-off roller 24a is disposed to provide a take-off nip adjacent roller 48.

Belt 44 has a primary embossing pattern thereon which may be similar to that illustrated in FIGS. 4 and 4A in the sense that it comprises a pattern having considerably deeper recesses than those of rubber sleeve 22a. The deformation of rubber sleeve 22a will force web material 28 into surface conforming contact with the lands and recesses of pattern 34 of belt 44.

The nip, corresponding to segment A of the FIGS. 1 and 3 embodiment, is formed between roller 46 and roller 20a. The "vacuum" and cooling zone, corresponding to segment B of the FIGS. 1 and 3 embodiment, is formed between rollers 46 and 48.

Generally, the resilient embossing surface of the first embossing member having the primary embossing pattern thereon, is between about 50 to 85 durometer on the Shore A scale. The hardness of the resilient embossing surface of the second embossing member, i.e., the softer embossing member, has a hardness within a range of 45 to 80 durometer on Shore A scale.

As an example of one specific embodiment of the invention, a polyvinyl chloride (PVC) sheet material of 3 mils thickness was embossed in accordance with the invention. The sheet material was heated to a temperature of between about 300°–350° F. and embossed to provide thereon the pattern illustrated in FIG. 5 of the drawings. The large, irregularly shaped lands (38a in FIG. 5A) of the embossed material are about 30 mils in depth and the entire material (including lands 38a) has the grain like pattern (40a in FIG. 5) superimposed thereover. The PVC sheeting used is that sold under the trademark AQUAFLEX by Pantasote Company of New York, Inc. The rollers were heated with oil at about 177° C. (350° F.) and the outer surface of the rubber embossing sleeves were at a temperature of about 120° C. (250° F.).

The embossed material may have a backing of muslin, cambric or the like glued or otherwise secured to one side of it. Preferably, the backing fabric is secured to the side having the open sides of the lands 38a, i.e., the left hand side of FIG. 5A.

In another test run, a polyester-based thermoplastic polyurethane sheeting of 3 mils thickness was identically embossed as described above with reference to the PVC sheeting but at a temperature of 350°–400° F. The polyurethane sheeting was that sold under the trademark TUFTANE by B. F. Goodrich General Products Company. The same equipment and temperatures were employed. In both cases, a pair of steel rollers having flexible silicone rubber sleeves of an inch thickness were employed.

The rubber sleeves are preferably fabricated from high temperature silicone resins such as those sold by General Electric Co. and Dow-Corning. However, other elastomers having high temperature resistance and the required durometer including polyurethanes may also be employed.

While the invention has been described in detail with respect to the specific preferred embodiment thereof, it will be apparent that, upon a reading and understanding of the foregoing, numerous alterations and modifications to the preferred embodiment will occur to those skilled in the art and it is intended to include such modifications and alterations within the scope of the appended claims.

What is claimed is:

1. In an apparatus for embossing a thermoplastic web material and including a first embossing member having a resilient embossing surface providing a primary embossing pattern of a first depth; a second embossing member having a resilient surface providing a secondary embossing pattern of a lesser depth than said first depth of said primary embossing pattern; means mounting said first and second embossing members for relative movement to define a roll nip therebetween; means to pass a heated thermoplastic web material through said nip to form an embossed pattern thereon, the improvement wherein said resilient surface of said first embossing member has a hardness of about 50 to 85 durometer on the Shore A scale and is at least about 5 durometer on the Shore A scale harder than said resilient surface of said second embossing member, the resilient surface of said second member having a hardness of about 45 to 80 durometer on the Shore A scale and said roll nip exerting sufficient pressure to temporarily deform both said resilient surfaces thereat, the associated web material being pressed in said nip between said resilient surfaces into surface-conforming contact with said first embossing member and remaining in contact with said primary embossing pattern thereof upon passage from said nip; and means for stripping the associated web material from said primary embossing pattern of said first embossing member at a point spaced from said nip in the direction of rotation of said first embossing member.

2. The apparatus of claim 1, wherein said primary embossing pattern is provided by lands and recesses, and wherein said recesses are deeper than any recesses provided by said secondary embossing pattern.

3. The apparatus of claim 1 wherein said primary embossing pattern is provided by lands and recesses, said recesses extending from about 3 to 50 mils below the upper surfaces of said lands, and said resilient embossing surface of said second embossing member has a thickness sufficient to press the associated web material in said nip into surface conforming contact with said lands and said recesses of said primary embossing pattern.

4. The apparatus of claim 1 wherein said resilient surfaces have a thickness of about 0.16 to 1.27 centimeters.

5. The apparatus of claim 1 wherein said resilient surfaces are provided by silicone rubber.

6. The apparatus of claim 1 wherein said first and second members each comprise a roller having a resilient sleeve mounted thereon, said resilient sleeves providing said resilient surfaces.

7. The apparatus of claim 1 wherein said first embossing member comprises a resilient endless belt supported on belt driving rollers.

8. The apparatus of claim 1 wherein said resilient embossing surface of said first embossing member is about 5 to 15 durometer harder than said resilient embossing surface of said second member.

9. In an apparatus for embossing a thermoplastic web material and including a first embossing member having a resilient embossing surface providing a primary embossing pattern defined by lands and recesses, said recesses extending about 3 to 50 mils below the surface of said lands; a second embossing member having a resilient embossing surface providing a secondary embossing pattern having a depth less than that of said recesses of said primary embossing pattern; means mounting said first and second embossing members for relative movement to define a roll nip therebetween; means to pass a heated thermoplastic web material through said nip to form an embossed pattern thereon; the improvement wherein both said resilient surfaces have a thickness of at least about 0.16 centimeters, said resilient surface of said first embossing member having a hardness of about 50 to 85 durometer on the Shore A scale and being at least about 5 durometer on the Shore A scale harder than said resilient surface of said second embossing member, the resilient surface of said second member having a hardness of about 45 to 80 durometer on the Shore A scale and said roll nip exerting sufficient pressure to temporarily deform both said resilient surfaces therein, the associated web material being pressed in said nip between said resilient surfaces into surface-conforming contact with said first embossing member and remaining in contact with said primary embossing pattern thereof upon passage from said nip; and means for stripping the associated web material from said primary embossing pattern of said first embossing member at a point spaced from said nip in the direction of rotation of said first embossing member.

10. The apparatus of claim 9 wherein said secondary pattern is a grain effect pattern.

11. The apparatus of claim 9 wherein said resilient embossing surfaces are provided by silicone rubber.

12. The apparatus of claim 1 wherein said resilient embossing surface of said first embossing member is about 5 to 15 durometer harder than said resilient embossing surface of said second embossing member.

13. In a method for embossing a thermoplastic web material, the steps comprising:
   a. heating a thermoplastic web material to an elevated temperature to its softening range;
   b. passing the heated web material into a roll nip formed between first and second embossing members having respective resilient embossing surfaces, said resilient embossing surface of said first embossing member providing a primary embossing pattern and having a hardness of about 50 to 85 durometer on the Shore A scale and at least about 5 durometer on the Shore A scale harder than said resilient embossing surface of said second embossing member, the resilient embossing surface of said second embossing member providing a secondary embossing pattern of lesser depth than the depth of the primary embossing pattern, said embossing surface of said second embossing member having a hardness of about 45 to 80 durometer Shore A scale;
   c. exerting sufficient pressure in said nip to temporarily deform both said resilient surfaces therein and to press said web material between said resilient surfaces into surface conforming contact with said first embossing member and into surface conforming contact with said secondary embossing pattern;
   d. withdrawing said web material from said nip while maintaining it in contact with said primary embossing pattern while said first embossing member rotates away from said nip;
   e. allowing said web material to cool while in contact with said primary embossing pattern sufficiently to set the embossed pattern therein; and
   f. removing the embossed web material from said primary embossing pattern of said first embossing member at a point spaced from said nip.

14. The method of claim 13 wherein said primary embossing pattern is defined by recesses and lands and said recesses extend about 3 to 50 mils below the upper surfaces of said lands, and wherein said web material is pressed into said surface conforming contact with said lands and recesses.

15. The method of claim 13 wherein said resilient embossing surfaces are provided by silicone rubber.

16. The method of claim 13 wherein said resilient embossing surface of said first embossing member is about 5 to 15 durometer on the Shore A scale harder than said resilient embossing surface of said embossing member.

* * * * *

UNITED STATES PATENT AND TRADEMARK OFFICE
CERTIFICATE OF CORRECTION

PATENT NO. : 4,211,743
DATED : July 8, 1980
INVENTOR(S) : JAN P. NAUTA and JACOB J. KOS It is certified that error appears in the above–identified patent and that said Letters Patent are hereby corrected as shown below:

Column 9, line 8, "Claim 1" should be -- Claim 11 --

Signed and Sealed this

Ninth Day of December 1980

[SEAL]

Attest:

SIDNEY A. DIAMOND

Attesting Officer

Commissioner of Patents and Trademarks